Figures 1, 2, 3, 4:
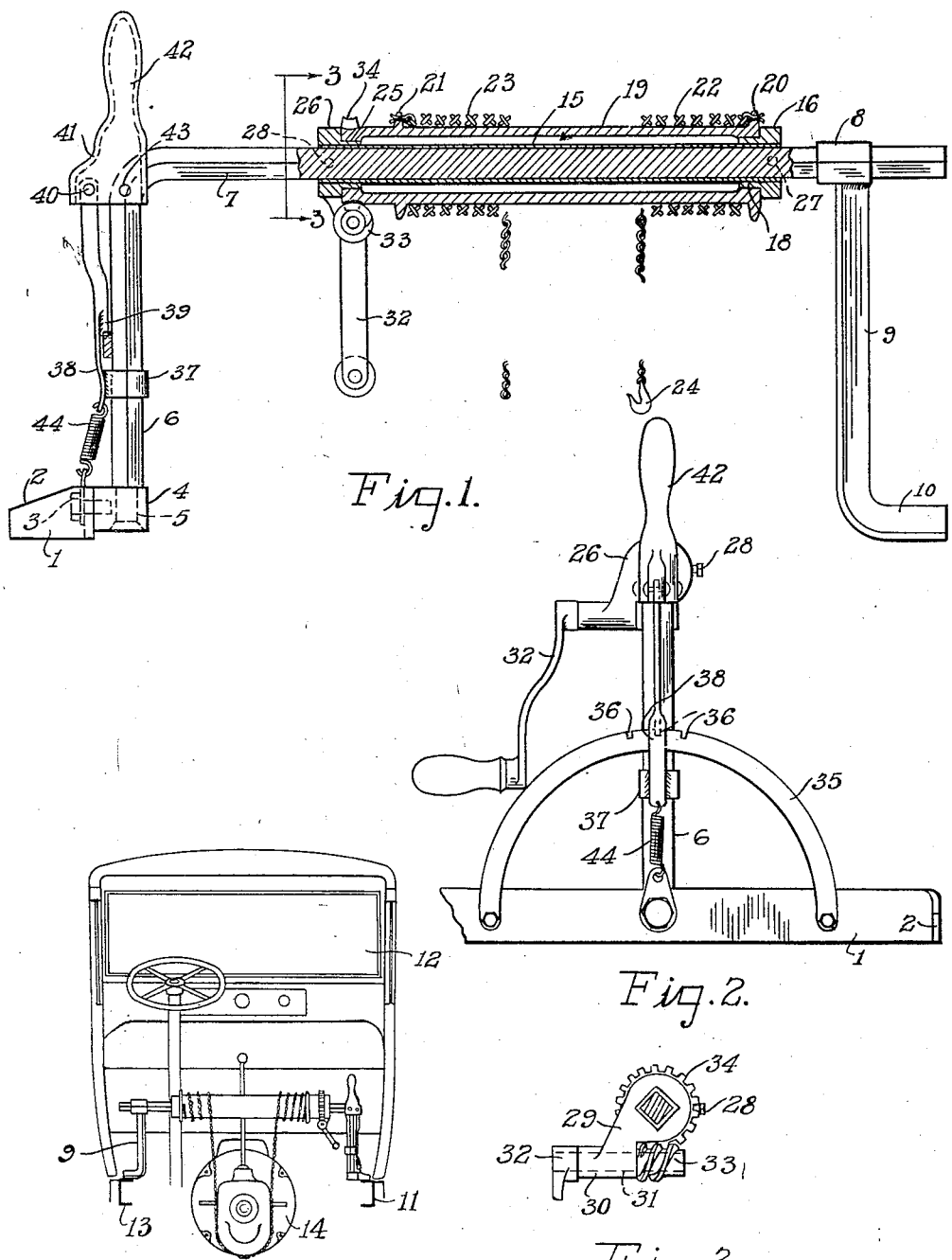

May 19, 1931.     F. R. BEAL     1,806,033

AUTOMOBILE TRANSMISSION LIFTING DEVICE

Filed April 17, 1930

INVENTOR,
Francis R. Beal,
BY Howard S. Smith,
His ATTORNEY

Patented May 19, 1931

1,806,033

UNITED STATES PATENT OFFICE

FRANCIS R. BEAL, OF PORT WILLIAM, OHIO

AUTOMOBILE TRANSMISSION LIFTING DEVICE

Application filed April 17, 1930. Serial No. 445,101.

This invention relates to new and useful improvements in automobile transmission lifting devices.

It is one of the principal objects of my invention to provide a simple, compact and efficient device for raising an automobile transmission mechanism for the purpose of repairing it, relining clutches or performing other work upon, under or near it.

Another object of my invention is to provide such a device that may be easily adjusted for support at the desired angle upon different sized chassis.

Other important and incidental objects will be brought out in the following specification and particularly set forth in the subjoined claims.

In the accompanying drawings illustrating my invention, Figure 1 is a side view of the device with the drum in section. Figure 2 is an end view, showing the quadrant for effecting the angular adjustment of the drum. Figure 3 is a sectional view on the line 3—3 of Figure 1, showing the worm drive. And Figure 4 is a skeleton view of an automobile, showing the device in place to lift the transmission mechanism.

Referring to the accompanying drawings illustrating my invention, the numeral 1 designates a preferably flat metallic base member formed with two end flanges 2, 2 turned outwardly at a right angle. To the middle part of the base member 1 there is pivotally secured, by a stud 3, a metal block 4.

The block 4 is formed with a vertical hole to receive the reduced cylindrical end 5 of the vertical leg 6 of a horizontal bar 7 preferably rectangular in cross section. Fitted on the outer end of this bar is a slidable sleeve 8, also rectangular in cross section. This sleeve is the integral top of a leg 9 that has a right angled foot portion 10.

With the base member 1 resting upon one side frame member 11 of an automobile 12, and the leg 9 supported upon the opposite side member 13 of its frame, the bar 7 will project over the transmission mechanism 14 to raise it through the following means after it has been unbolted.

Slidable on the bar 7 is a square sleeve 15 to which a collar 16 is applied. This collar has a reduced inner cylindrical shoulder 18 that acts as a bearing for one end of a drum 19. The latter has two flanges 20 and 21 spaced a suitable distance apart to provide between them a peripheral space to receive two chains 22 and 23. The inner end of the chain 22 is secured in a hole in the flange 20, while the inner end of the other chain 23 is secured in a hole in the flange 21 of the drum. When the latter is rotated by means to be described, these chains through a grappling hook 24 secured to one of their free ends, will raise the transmission 14 to the desired height.

The front end of the drum 19 turns around a bearing provided by a reduced cylindrical shoulder 25 on the inner end of a collar 26 fitted to the slidable sleeve 15 on the bar 7. The collars 16 and 26 are fixedly secured to the sleeve 15 by set screws 27 and 28 respectively.

The collar 16 has a downwardly projecting part 29 that terminates in a hollow horizontal boss 30 at right angles to the bar 7. Free to rotate in this boss 30 is a shaft 31 to whose outer end a handle 32 is secured. Attached to the inner end of the shaft 31 is a worm 33 which meshes with teeth 34 formed around the periphery of the front end of the drum 19. When the handle 32 is rotated clockwise, the drum will be turned to wind the chains 22 and 23 upon it to raise the transmission mechanism; and when the handle is rotated in the opposite direction the transmission mechanism will be lowered into place.

The leg 6 is adjusted to different angular positions by the following means. Secured to the base member 1 near each end thereof, is a quadrant 35 formed with spaced slots 36 in its top portion. Free to slide over the leg 6, just below the top of the quadrant 35, is a square sleeve 37 to whose outer portion there is welded or otherwise secured the lower end of a detent 38. This end of the latter is recessed as shown in the drawings to provide a shoulder part 39 which is adapted to enter one of the slots 36 in the quadrant to hold the leg 6 in an adjusted position.

The upper end of the detent 38 is pivotally secured by a pin 40 within the outer part of the sleeve portion 41 of a handle 42. The inner part of this sleeve portion, which is wider than its outer part, is pivotally secured, by a pin 43, to the top portion of the leg 6, whereby, when the handle 42 is drawn inwardly, it will raise the shoulder 39 on the detent above the slot 36 in which it rests, to permit the leg 6 to be adjusted to a new position. A coil spring 44, connected between the lower end of the detent and the stud 3, holds the shoulder on the detent in the selected slot 26 until it is withdrawn.

It is thus seen that the leg 6 may be adjusted about the axis of the stud 3 to hold the drum in a desired lateral position over the transmission mechanism which is to be raised. It also permits the drum to occupy a correct position when one end of the base member 1 is supported at a higher elevation than its other end due to a sloping position of the car frame. This base member may also be turned about the axis of the leg 6 if the base member can best be supported in an angular position.

Having described my invention, I claim:

1. A device of the type described for raising a transmission mechanism above the frame of an automobile, comprising a horizontal bar, a fixed vertical leg at one end of said bar, a vertical leg slidably secured to its other end, a drum carried by said bar between its legs, a chain secured at one end to the drum, with its other end free to be attached to said transmission mechanism, means for rotating said drum, a base member, and means pivotally connecting the lower end of the fixed leg to the base member whereby each may be moved about the axis of the other for the purpose specified.

2. A device of the type described for raising a transmission mechanism above the frame of an automobile, comprising a horizontal bar, a fixed vertical leg at one end of said bar, a vertical leg slidably secured to its other end, a drum carried by said bar between its legs, a chain secured at one end to the drum, with its other end free to be attached to said transmission mechanism, means for rotating said drum, a horizontal base member which, together with the slidable leg, is adapted to be supported by the automobile frame, a block pivotally secured to the lower end of the fixed leg, and means for pivotally securing the block to the middle inner portion of the base member for the purpose specified.

3. A device of the type described for raising a transmission mechanism above the frame of an automobile, comprising a horizontal bar, a fixed vertical leg at one end of said bar, a vertical leg slidably secured to its other end, a drum carried by said bar between its legs, a chain secured at one end to the drum, with its other end free to be attached to said transmission mechanism, means for rotating said drum, a horizontal base member which, together with the slidable leg, is adapted to be supported by the automobile frame, means pivotally connecting the lower end of the fixed leg to the base member whereby each may be moved about the axis of the other, a quadrant secured to said base member, adjacent the fixed leg of the horizontal bar, and formed with slots in its top part, a detent having a shoulder adapted to rest in a selected one of said slots, a slidable sleeve on the fixed leg, secured to said detent, a spring connected between the lower end of the detent and the base member, a handle pivotally secured to the top portion of the fixed leg, and means pivotally securing the upper end of the detent to the handle for the purpose specified.

In testimony whereof I have hereunto set my hand this 15th day of April, 1930.

FRANCIS R. BEAL.